United States Patent [19]

van de Bult

[11] 4,430,679
[45] Feb. 7, 1984

[54] MAGNETICALLY SHIELDED CARRYING ARM ARRANGEMENT FOR A MAGNETIC DISC STORAGE

[75] Inventor: Oelke van de Bult, The Hague, Netherlands

[73] Assignee: U.S. Philips Corporation, New York, N.Y.

[21] Appl. No.: 305,311

[22] Filed: Sep. 24, 1981

[30] Foreign Application Priority Data

May 22, 1981 [NL] Netherlands ............... 8102521

[51] Int. Cl.³ .............................................. G11B 5/55
[52] U.S. Cl. ................................................... 360/106
[58] Field of Search ....................... 360/97, 102–106, 360/128, 137

[56] References Cited

U.S. PATENT DOCUMENTS 4,034,411 7/1977 Kraemer et al. ............... 360/106 X
4,305,105 12/1981 Ho et al. ............................. 360/106

OTHER PUBLICATIONS

Brede et al., IBM, TDB, vol. 12, No. 7, p. 958, "Shielding Method".
Kehr et al., "Making Electromagnetic Shields Including Ferrite," IBM, TDB, vol. 15, No. 8, p. 2508.

Primary Examiner—Alfred H. Eddleman
Assistant Examiner—Kin Wong
Attorney, Agent, or Firm—Joseph P. Abate

[57] ABSTRACT

A carrying-arm arrangement for a magnetic disc store includes a movable carrying arm connected to at least one magnetic head. The magnetic head is shielded from spurious magnetic fields by a mu-metal shield which is connected to the arm and extends over the head.

8 Claims, 6 Drawing Figures

MAGNETICALLY SHIELDED CARRYING ARM ARRANGEMENT FOR A MAGNETIC DISC STORAGE

BACKGROUND OF THE INVENTION

The invention relates to a carrying arm arrangement for moving and positioning at least one magnetic head over a surface of a rotatable magnetic disc of a magnetic-disc storage apparatus for the storage and reproduction of data in digital form, and more particularly to such an arrangement including a carrying arm and a plurality of magnetic heads each connected to the arm.

Magnetic disc storage equipment comprising one or a plurality of rigid magnetic discs each serving for the storage and reproduction of data in digital form on at least one side and generally on both sides is employed on a large scale as peripheral equipment for data processing apparatus such as computers.

The magnetic discs rotate with a high speed, for example 3600 revolutions per minute. The magnetic heads, which are secured to ends of the carrying arm arrangements, are moved over the surfaces of the magnetic discs to locations which are preselected by the data processing apparatus in order to store data in a specific track on the magnetic disc or in order to reproduce data from said track. The carrying arm arrangements comprise carrying arms which are either linearly movable in a radial direction or pivotable about a pivotal axis parallel to the axis of rotation of the magnetic discs. The magnetic heads should be moved as fast as possible over the magnetic discs in order to minimize the time required for locating the correct track and storing or reproducing the data. The magnetic discs are manufactured with an extremely high degree of flatness. The magnetic heads float on a very thin film of air very close to the surface of the magnetic discs.

In many cases, each magnetic head is secured to a resilient magnetic head carrier in order to obtain the mobility which permits the magnetic head to float on the air film and in order to provide a resilient load which exerts an accurately defined pressure on said head. In order to minimize the external dimensions of magnetic disc storage equipment, the various manufacturers attempt to arrange the magnetic discs as close as possible to each other. The carrying arm arrangements, especially when they are interposed between two magnetic discs, should, therefore, be as flat as possible and move as close as possible to the magnetic disc surface. It is obvious that the carrying arm should never touch the magnetic disc surface because this would render the magnetic disc unserviceable.

Carrying arm arrangements for magnetic disc storage equipment should, therefore, be manufactured with the necessary precision.

A swing arm arrangement of the type mentioned in the opening paragraph is known from U.S. Pat. No. 4,150,407. The known swing arm arrangement comprises one or more aluminum swing arms in the form of bifurcated levers which are pivotable about a pivotal axis disposed between two ends. Arranged near the one end of each swing arm is a magnetic head unit comprising the magnetic head and a resilient magnetic head carrier. The carrier is rigidly connected to the carrying arm. On the other end of the swing arm, a control coil is arranged. Said coil belongs to electromagnetically and electrically controllable actuating means by means of which it is possible to impart a pivotal movement about the pivotal axis of the swing arm to said arm, so as to enable the magnetic head to be moved over the magnetic disc in a substantially radial direction.

In a version of the known arrangement comprising a plurality of swing arms, said arms are arranged above and spaced from one another and they are combined to form an assembly of swing arms which are pivotable about the pivotal axis. Each swing arm carries a separate flat control coil, so that these coils are also combined to form an assembly of control coils which are spaced from each other. The assembly of swing arms is journalled on a frame by means of a bearing arrangement which comprises two ball bearings and a bearing pin on which the inner races of the ball bearings are fixed by suitable means so as to be axially spaced from each other. The outer races of the ball bearings are fitted in a bearing housing which is screwed to the deck of the magnetic disc storage apparatus; a compression spring between the outer races eliminating the axial bearing play. The control coils move in a permanent magnetic stator.

Said stator comprises a stator frame and a plurality of flat, axially magnetized permanent stator magnets which are connected to the stator frame and between which air gaps are formed for each flat control coil, so that each control coil is movable in an axial permanent magnetic field within an air gap formed between permanent stator magnets. On each side of the stator, iron stator end plates are arranged which extend over the interposed control coils and stator magnets and on which the outermost stator magnets are mounted, so that the axial permanent magnetic stator fields are closed via the iron stator end plates. Each control coil comprises turns of an electrically conductive material wound onto a plastics coil former which forms one structural unit with the control coil by means of a synthetic resin. The control coils are connected to the swing arms by clamping and glueing on the ends of the swing arms which are remote from the magnetic heads.

A swing arm arrangement of the type mentioned in the opening paragraph is also known from U.S. Pat. No. 4,196,456. This known swing arm arrangement bears great resemblance to the previously mentioned known swing arm arrangement except that the control coils are not arranged directly on the swing arms but are stacked on a bearing bush as separate units. The bearing pin is fixed.

SUMMARY OF THE INVENTION

It is an object of the present invention to provide a carrying arm arrangement of the type mentioned in the opening paragraph which arrangement operates in a more reliable manner when sources of electromagnetic interference are disposed in its vicinity. The instant carrying arm arrangement is for example, suitable for compact magnetic disc stores provided with magnetic discs of smaller diameter such as of the order of magnitude of 13 cm and smaller, in order to render such magnetic disc stores suitable for use on a larger scale.

The invention is characterized in that at least one of the magnetic heads, for example, the outermost of a stack of magnetic heads, is shielded from spurious magnetic fields by a mu-metal shield which is connected to a carrying arm and which is disposed at a location proximate to the head outer side facing away from the disc surface. The shield extends over and a distance beyond the head. The shield can be elongate. If there is a plurality of shields, each shield preferably has an identical shape.

In a carrying-arm arrangement in accordance with the invention the risk of errors in the storage and reproduction of data is reduced by this shielding from spurious electromagnetic fields. Such fields may, for example, be produced by a motor arranged in the proximity for driving the magnetic discs.

In an embodiment of the invention, a semiconductor circuit for processing the signals from the magnetic heads is arranged on the shield. Therefore, the shield serves another useful purpose and the distance between the magnetic head and the circuit is minimal. In this respect, a further embodiment of the invention is of interest, which is characterized in that the integrated semiconductor circuit is mounted on a flexible plastics strip provided with electrically conductive tracks. The strip is secured to the shield at a first end and, near a second end, is connectable to stationary parts of a magnetic disc storage apparatus; the plastics strip comprising a freely movable portion between said ends.

BRIEF DESCRIPTION OF THE DRAWINGS

An embodiment of the invention will now be described in more detail with reference to the drawing, in which.

DESCRIPTION OF THE PREFERRED EMBODIMENT

Figure 1:
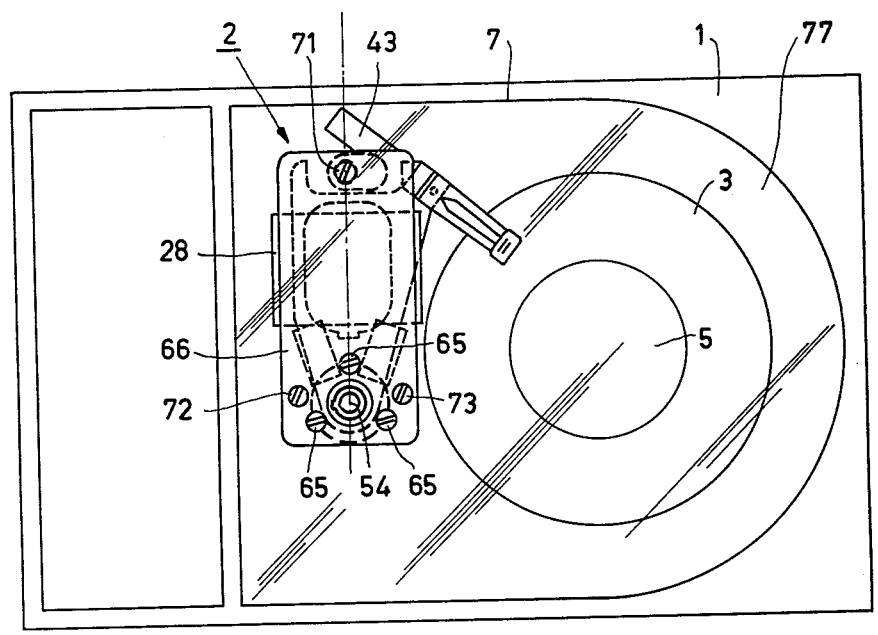
FIG. 1 is a plan view of a magnetic disc storage apparatus.

The magnetic disc storage apparatus comprises a frame 1 to which a carrying arm arrangement 2 is rigidly secured. Two rigid magnetic discs 3 and 4 are arranged coaxially on a common spindle 5 so as to be spaced from each other, and rotate about an axis of rotation 6. The carrying arm arrangement 2 and the magnetic discs 3 and 4 are covered by a plastics cover 7. Said cover protects the magnetic discs 3 and 4 against dust and other contaminatants. For the sake of brevity, those parts of the magnetic disc storage apparatus which are irrelevant to the present invention are not described and are not shown in the drawing, except for a box shaped unit 8 which accommodates the electronic circuitry necessary for the operation of the magnetic disc storage apparatus.

The carrying-arm arrangement in accordance with the invention will now be described in more detail with reference to FIG. 3. The carrying arm arrangement serves for moving and positioning four magnetic heads 9 to 12 over two rotating rigid magnetic discs 3 and 4. Said magnetic heads are spaced from each other by a distance corresponding to the spacing between the magnetic discs 3 and 4 and are, together, arranged on a single swing arm 14 which is pivotable about a pivotal axis 13. The magnetic heads are, together, mounted on a single mounting device 15 which is formed with the faces, recesses and threaded holes necessary for locating and mounting the magnetic heads on the swing arm. The mounting device 15 is rigidly connected to the swing arm 14 by glueing, using a method as proposed in the applicant's copending application no. 305,313, 824 herewith incorporated by reference.

Each of the magnetic heads 9 to 12 is arranged on a resilient magnetic-head carrier, 9a to 12a, respectively, which, at its end, is provided with a fixing part 9b to 12b, respectively, which is equipped with a fixing bush 9c to 12c, respectively. The mounting device 15 is formed with a through-hole 16, in which the fixing bushes fit with some clearance. In order to secure a magnetic head unit (comprising a magnetic head, the elastic head carrier and the fixing part) to the mounting device 15, a slightly oversized ball is forced through the relevant fixing bush so that the clearance between the fixing bush and the through-hole is eliminated. Such magnetic head units are commercially available.

The center of gravity of the assembly comprising the mounting device 15 and the magnetic heads 9 to 12 arranged thereon is disposed substantially in the plane of pivoting of the swing arm 14. This also applies to the other parts of the magnetic head units. However, these parts have a substantially lower mass than the magnetic heads and the mounting device.

The mounting device 15 comprises a plurality of projections 17, 18 and 19 for mounting the magnetic heads 9 to 12 at regular distances from each other in such a way that the projections constitute a comb. The mounting device comprises a plurality of parts 20, 21 and 22 which are detachably secured to each other. Each part 20, 21, 22 comprises a projection of the comb. The parts 20 and 22 are secured to the central part 21 by means of bolts 23 and 24. The part 21 is glued to the swing arm 14, using the previously mentioned method, before the magnetic heads 10 and 11 are connected to the projection 18 by means of the fixing bushes 10c and 11c. The magnetic heads 9 and 12 are connected to the projections 17 and 19 of the parts 20 and 22 before said parts are connected to the center part 21 by means of the bolts 23 and 24. This facilitates mounting of the vulnerable magnetic head units on the mounting device 15.

Figure 2:
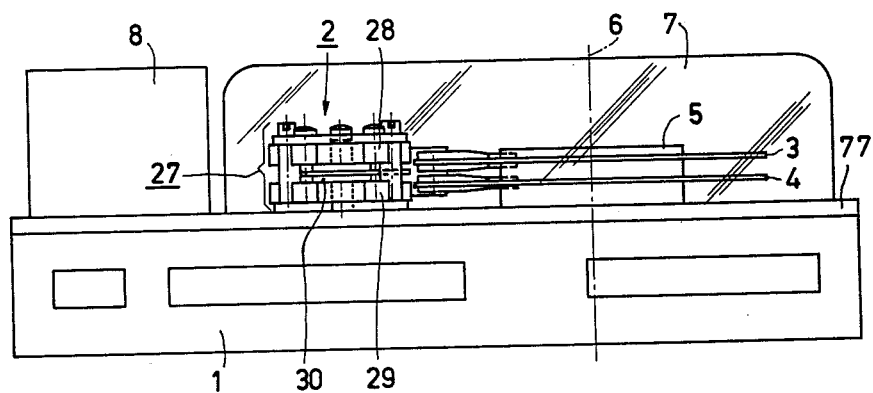
FIG. 2 is a side view of the magnetic disc storage apparatus of FIG. 1.

The swing arm comprises a first end 25 and a second end 26. The magnetic heads 9 to 12 are connected to the swing arm near the first end 25. The swing arm arrangement comprises a permanent magnetic stator 27 having flat permanent stator magnets 28 and 29 which are spaced from each other and between which an air gap 30 is formed; see FIG. 2. In said air gap, there is arranged a flat control coil 31 of an electrically conductive material. The coil is connected to the swing arm 14. The swing arm 14 is pivotably journalled by means of a bearing arrangement 32. The flat control coil 31 is arranged in a recess 33 of the swing arm 14. The swing arm was die cut from aluminium sheet. The recess 33 being formed during the die cutting operation. The bearing arrangement 32 is situated near the second end 26 of the swing arm and the control coil 31 is arranged between the first end 25 and the second end 26 of the swing arm.

The swing arm is manufactured from a single flat piece of sheet material and the flat control coil 31 has a thickness dimension which is substantially equal to the thickness dimension of the sheet material from which the swing arm is manufactured. The recess 33 in the swing arm has a shape which corresponds to the shape of the outer circumference of the control coil 31. The recess and the coil are dimensional such that the coil fits in the recess with clearance.

Figure 3:
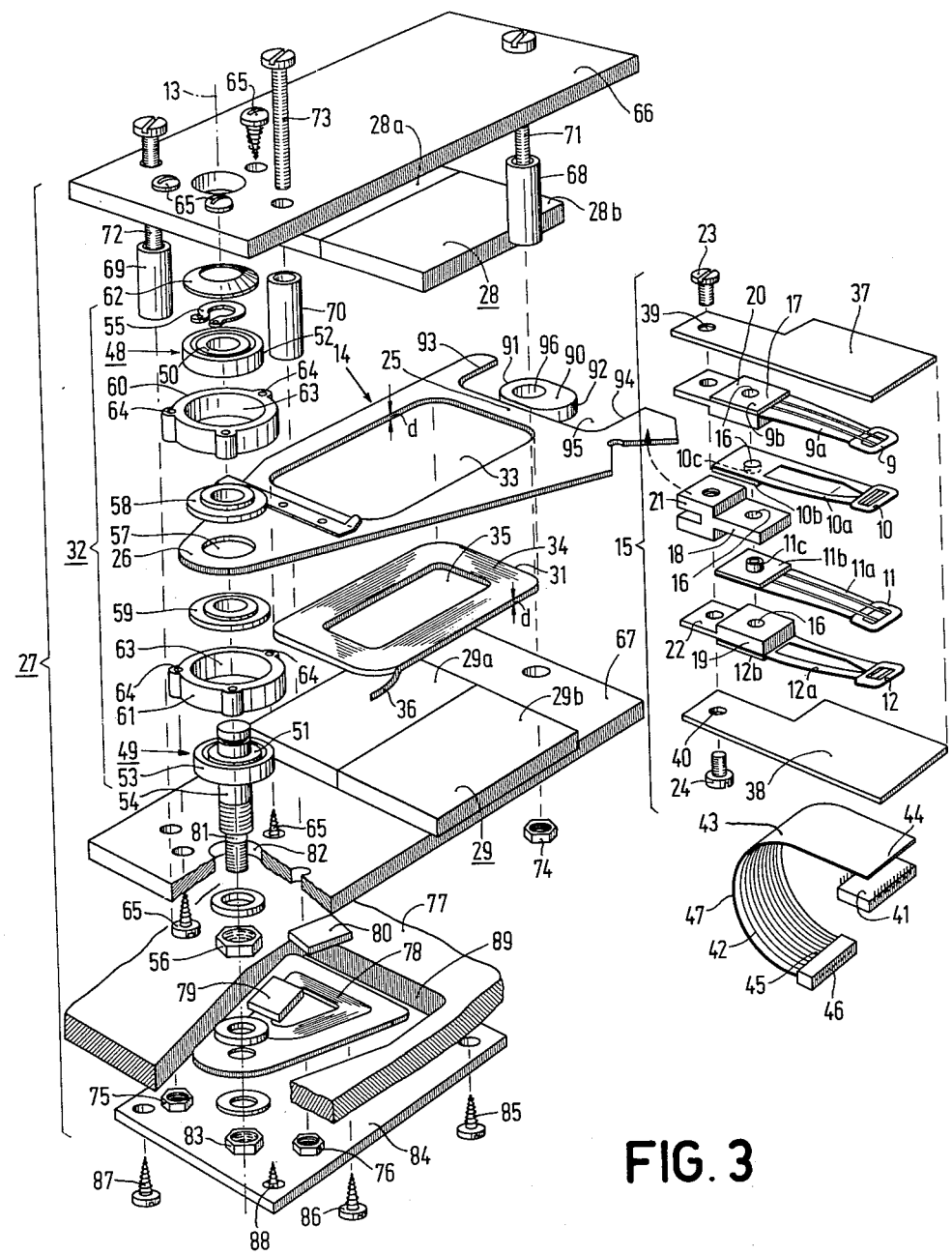
FIG. 3 is an exploded view of a carrying-arm apparatus as used in the magnetic disc storage apparatus shown in FIGS. 1 and 2, and FIGS. 4-6 represent the carrying arm of the carrying arm arrangement in different positions.

The control coil is glued in the swing arm 14 and is attached to the wall of the recess 33 by means of a film of glue which is not visible in FIG. 3. The control coil is situated in the plane of the swing arm, so that the swing arm with the control coil glued therein constitutes a flat unit of substantially constant thickness. The turns 34 of the control coil are made of an electrically conductive material and are wound onto a central flat plastics coil former 35. The electrically conductive material is not formed by an elongate copper wire, as is customary for control coils, but by an elongate aluminium strip 36 having a width dimension equal to the thickness "d" of the coil and having a thickness dimension which is substantially smaller. The glue for connecting the control coil 31 to the wall of said recess 33 has been mixed with aluminium powder in order to ensure a satisfactory heat transfer between the coil and the sheet material of the swing arm.

The two outermost magnetic heads 9 and 12 of the stack of magnetic heads 9 to 12 are shielded from spurious magnetic fields by mu-metal shields 37 and 38 which extend over the outsides of and beyond the respective magnetic heads and which are connected to the swing arm 14 via the mounting device 15. The shields are formed with openings 39 and 40 and, together with the parts 20 and 22 of the mounting device 15, they are connected to the central part 21 of the mounting device by means of bolts 23 and 24, respectively. On the lower shield 38, an integrated semiconductor circuit 41 is mounted for processing signals from the magnetic heads 9 to 12. Thus, said signals can be amplified before they are applied to the signal processing sections of the magnetic disc storage apparatus. The semiconductor circuit 41 is mounted on a flexible plastics strip 43 provided with electrically conductive tracks 42, which strip is secured to the shield 38 at a first end 44. Near a second end 45 the plastics strip is connected to a stationary connector on the frame 1 of the magnetic disc storage apparatus via a multi-pole connector 46. Between said first and second ends 44 and 45 the plastics strip 43 comprises a freely movable portion 47 which does not impede the movements of the swing arm 14.

The bearing arrangement 32 for pivotably journalling the swing arm comprises a first ball bearing 48 and a second ball bearing 49 having inner races 50 and 51 and outer races 52 and 53, respectively. The two inner races 50 and 51 are fixed on a bearing pin 54, axially spaced from each other, by means of a circular clip 55 and a nut 56. The ball bearings 48 and 49 are located on both sides of the swing arm 14. The swing arm is formed with an opening 57 for the bearing pin 54. On each side of the swing arm, rings 58 and 59 are disposed which retain the swing arm between the inner races 50 and 51 for the ball bearings 48 and 49. The outer races 52 and 53 of the ball bearing engage with bearing housing means which comprise a first and a first second bearing housing 60 and 61, respectively. Axial clearance between the outer races 52 and 53 of the ball bearings is eliminated in that they are axially loaded by means of pressure spring means in the form of a cup spring 62 which is disposed near the outer race 52 on top of the upper ball bearing 48. The ball bearings have sliding fits in the bearing housings 60 and 61 and the cup spring 62 urges the ball bearings axially towards each other. Each bearing housing comprises a length of extruded tube with central through-hole 63 for the outer races 52 and 53 of the two ball bearings 48 and 49 and three parallel through-holes 64 of smaller cross section, which are situated around the central hole 63. The bearing housings 60 and 61 are secured by means of self-tapping screws 65 which are fitted into said holes 64.

The permanent magnetic stator 26 comprises a stator frame with two iron stator end plates 66 and 67, one on each side of the stator, which stator end plates extend over the interposed control coil 31 and the stator magnets 28 and 29. Said magnets are glued onto the stator end plates. The stator magnets are axially magnetized in the direction of the pivotal axis 13 of the swing arm 14. The stator magnet 28 comprises two zones 28a and 28b which are oppositely polarized. The magnet 29 also comprises two oppositely polarized zones 29a and 29b. At their sides facing the control coil 31, the zone 28a is polarized oppositely to the zone 29a and the zone 28b oppositely to 29b, so that the parts of the control coil 31 between the permanent stator magnets are disposed in permanent magnetic fields of opposite polarity. The axial permanent magnetic fields are closed via the two iron end plates 66 and 67. Instead of integral stator magnets 28 and 29, it is also possible to employ a plurality of separate magnets. As an example, the stator magnet 28 may comprise two parts—the zone 28a belonging to the one stator magnet and the zone 28b to the other stator magnet.

The end plates 66 and 67 of the permanent magnetic stator 27 extend transversely of the pivotal axis 13 of the swing arm 14 beyond the bearing pin 54. The bearing housings 60 and 61 are secured to the stator end plates 66 and 67 by means of the self-tapping screws 65. Thus, the stator end-plates 66 and 67 also constitute the frame plates for the bearing arrangement 32. In addition to the two stator end plates 66 and 67, the stator 27 comprises three spacers 68, 69 and 70. By means of three bolts 71, 72 and 73 and associated nuts 74 to 76, the assembly comprising the stator end plates 66 and 67 and the three spacers 68 to 70 are combined to form a rigid unit constituting the stator frame of the permanent magnetic stator. Because the bearing housings 60 and 61 are secured to said stator frame, the stator frame also constitutes a frame for the complete swing arm arrangement. The stator end-plate 67 also serves as the base plate by means of which the complete swing arm arrangement can be mounted on the deck 77 of the magnetic disc storage apparatus. The means for connecting the swing arm arrangement 2 to the deck 77 are not shown, but will generally comprise screw means.

The embodiment of the swing-arm arrangement shown in the drawing is equipped with a tacho-coil 78 which is connected to the swing arm 14 and which is movable in a permanent magnetic field in order to generate an induction voltage which is a measure of the speed of pivoting of the swing arm 14. For this purpose, permanent tacho-magnets 79 and 80 are arranged on the outer side of the stator end plate 67. The magnets 79, 80 are magnetized axially and oppositely in the direction of the pivotal axis 13. Instead of two magnets, a single flat magnet may be used with zones of opposite polarization. The stator end plate 67 also serves for closing the axial magnetic fields produced by the two tacho-magnets 79 and 80 on one side. At the inner side of the stator end plate 67, the bearing pin 54 comprises a free end 81 which extends through an opening 82 in said stator end plate beyond the outer side thereof. The tacho-coil 78, which is flat like the control 31, is secured to the free end 81 of the bearing pin 54 by means of a nut 83 and can move in a permanent magnetic field produced by the tacho-magnets 79 and 80. At some distance from the stator end-plate 67, there is arranged an iron tacho end plate 84 parallel thereto. The tacho coil 78 moves parallel to the flat tacho-magnets 79 and 80, leaving an air gap between the stator end plate 67 and the tacho end plate 84, so that the axial permanent magnetic field of the tacho-magnets is closed by the stator end plate on one side and the tacho end plate on the other side. The stator end plate 84 is secured to the underside of the deck 77 by means of four self-tapping screws 85 to 88, but may alternatively be secured to the stator end plate 67 by means of separate spacer means. The tacho-magnets 79 and 80 as well as the tacho-coil 78 are disposed in a recess 89 of the deck 77.

The two stator end-plates 66 and 67 comprise substantially identical plates which are die cut from a flat magnetizable sheet material. Thus, they can be manufactured cheaply using simple means and, therefore, only one type of stator end plate needs to be manufactured. The requirements imposed on the manufacturing accuracy are not stringent so that, after die cutting the stator end plates need not be subjected to any machining operation. The stator magnets 28 and 29 extend in a direction which is substantially transverse to the direction of pivoting of the control coil 31, slightly beyond the edges of the stator end plates 66 and 67, respectively; see also FIG. 1.

Figure 4:
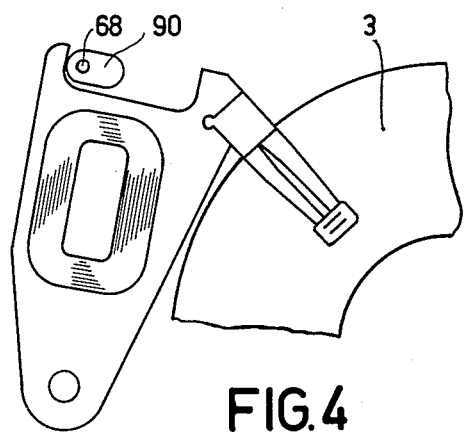
Figure 5:
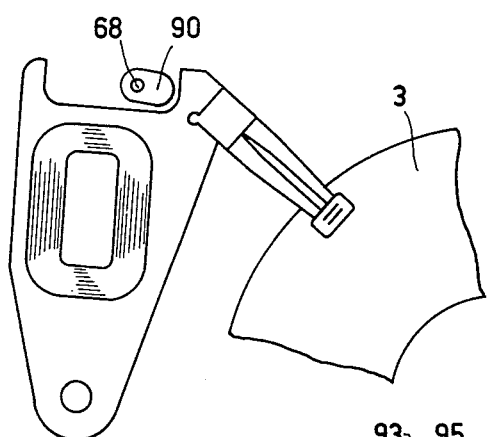
Figure 6:
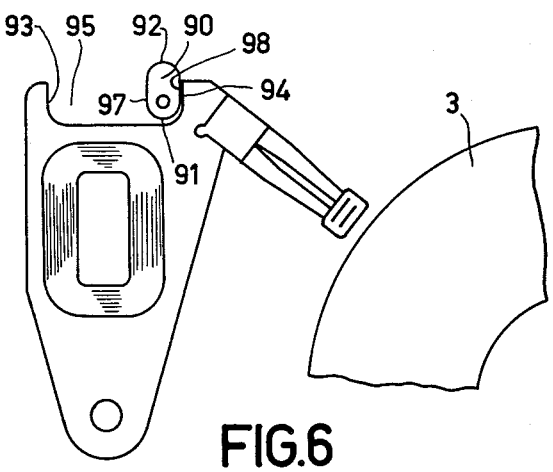

There is provided a stop 90 which, with opposite sides 91 and 92, cooperates with the respective sides 93 and 94 of the wall of a recess 95 in the swing arm 14. The sides 91 and 92 of the stop 90 limit the pivotal movement of the swing arm between a first and a second position. See FIGS. 4 and 5, which represent the swing arm 14 in the first or inner position and the second or outer position, respectively. The stop 90 is made of rubber and is movable between an operating position (see FIGS. 4 and 5) and a maintenance position (see FIG. 6). The stop, which is made entirely of elastic rubber, comprises a rotatable stop cam which is a moderately tight fit on the spacer 68. For this purpose, the stop has an opening 96 of a diameter which is slightly smaller than the outer diameter of the spacer 68. The opening is eccentric so that the stop cam is eccentrically rotatable between the operating position and the maintenance position. In the maintenance position the stop cam has been rotated through 90°.

In this maintenance position, the sides 93 and 94 of the wall of the recess 95 cooperate with opposite sides 97 and 98 of the stop cam. Said sides 97, 98 are situated nearer each other than the sides 91 and 92 so that, for maintenance purposes, the swing arm 14 can be pivoted through such an extended range that the magnetic heads 9 to 12 will be situated beside the surface of the magnetic discs 3 and 4. This position is also employed during assembly of the magnetic disc apparatus to enable the magnetic heads to be mounted on the magnetic disc apparatus without being damaged.

While there has been shown and described what is at present considered the preferred embodiment of the present invention, it will be apparent to those skilled in the art that various changes and modifications may be made therein without departing from the spirit and scope of the invention as defined by the appended claims. Specifically, each magnetic head may be shielded. If a plurality of magnetic heads is used for each side of the magnetic disc, these heads may be shielded together by means of a single shield.

What is claimed is:

1. A carrying arm arrangement for moving and positioning a magnetic head over a surface of a rotatable magnetic disc of a magnetic disc storage apparatus for digital data, the arrangement comprising:
   a movable carrying arm, and a magnetic head connected to the carrying arm, the head having an outer side facing away from the disc surface during normal operation of the storage apparatus,
   characterized in that a mu-metal shield for shielding the head from spurious magnetic fields is disposed at the head outer side and is connected to the carrying arm, the shield extending a distance beyond the magnetic head, whereby the shield is movable with the head.

2. A carrying arm arrangement as claimed in claim 1, characterized in that an integrated semiconductor circuit for processing signals from the magnetic head is arranged on said shield.

3. A carrying arm arrangement as claimed in claim 2, characterized in that the integrated semiconductor circuit is mounted on a flexible plastics strip provided with electrically conductive tracks, which strip is secured to the shield at a first end and, near a second end, is connected to stationary parts of the magnetic disc storage apparatus, the plastics strip comprising a freely movable portion between the ends.

4. A carrying arm arrangement for moving and positioning a plurality of magnetic heads over surfaces of at least one rotatable magnetic disc of a magnetic disc storage apparatus for digital data, the arrangement comprising:
   a pivotal carrying arm;
   a plurality of magnetic heads arranged in a stack and spaced from each other, each head being connected to the carrying arm, and
   means for shielding the magnetic heads from spurious magnetic fields,
   characterized in that the shielding means includes a pair of substantially planar shields fixed to the carrying arm, each shield being disposed at a location proximate to a respective outermost magnetic head, whereby the shields are pivotal with said heads.

5. An arrangement as claimed in claim 4, wherein the shields have an identical shape.

6. An arrangement as claimed in claim 4, wherein the shields are elongate and extend substantially an equal distance beyond the respective magnetic heads.

7. An arrangement as claimed in claim 6, wherein the shields are mu-metal shields.

8. A carrying arm arrangement for moving and positioning a plurality of magnetic heads over surfaces of at least one magnetic disc of a magnetic disc storage apparatus for digital data, the arrangement comprising:
   a movable carrying arm;
   a plurality of magnetic heads arranged in a stack and spaced from each other, each head being connected to the carrying arm, and
   means for shielding the heads from spurious magnetic fields,
   characterized in that the shielding means consists of a pair of planar mutually parallel mu-metal shields fixed to the carrying arm, each shield being disposed at a location proximate to a respective outermost head, whereby the shields are movable with the heads.

* * * * *